United States Patent
Kim et al.

(10) Patent No.: US 10,885,556 B2
(45) Date of Patent: Jan. 5, 2021

(54) FASHION DISPLAY SYSTEM, METHOD, RECORDING MEDIUM AND DISPLAY APPARATUS

(71) Applicant: International Business Machines Corporation, Armonk, NY (US)

(72) Inventors: Minkyong Kim, Scarsdale, NY (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 864 days.

(21) Appl. No.: 15/186,761

(22) Filed: Jun. 20, 2016

(65) Prior Publication Data

US 2017/0364959 A1    Dec. 21, 2017

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0261* (2013.01)

(58) Field of Classification Search
CPC ............... G06Q 30/00; G06Q 30/0601; G06Q 30/0639; G06Q 30/0641; G06Q 30/0643
See application file for complete search history.

(56) References Cited

U.S. PATENT DOCUMENTS

| | | | | |
|---|---|---|---|---|
| 6,529,940 B1* | 3/2003 | Humble | ................. | G06Q 30/02 |
| | | | | 709/204 |
| 8,843,402 B2* | 9/2014 | Vock | .................... | G06Q 10/043 |
| | | | | 705/27.1 |
| 8,861,866 B2 | 10/2014 | Zhang et al. | | |
| 2002/0059211 A1* | 5/2002 | Kuramochi | ............ | G06Q 10/06 |
| 2003/0110099 A1 | 6/2003 | Trajkovic et al. | | |
| 2004/0039592 A1* | 2/2004 | Shima | ................ | G06Q 30/0601 |
| | | | | 705/26.1 |
| 2006/0197775 A1* | 9/2006 | Neal | .................... | A45D 44/005 |
| | | | | 345/589 |
| 2007/0288296 A1* | 12/2007 | Lewis | .................... | G06Q 30/02 |
| | | | | 186/52 |
| 2008/0284566 A1* | 11/2008 | Zai | ........................ | G06Q 10/087 |
| | | | | 340/7.56 |

(Continued)

OTHER PUBLICATIONS

Asteriadis, Stylianos, et al. "Estimation of behavioral user state based on eye gaze and head pose—application in an e-learning environment." Multimedia Tools and Applications 41.3 (2009): 469-493. (Year: 2009).*

(Continued)

*Primary Examiner* — Christopher B Seibert
(74) *Attorney, Agent, or Firm* — Anthony Curro, Esq.; McGinn IP Law Group, PLLC (57) ABSTRACT

A fashion display method, system, and non-transitory computer readable medium, include a customer identification circuit configured to identify a fashion style of a customer viewing a fashion display, a customer assessing circuit configured to determine an assessed trait of the customer by assessing the fashion style of the customer, and a display augmenting circuit configured to augment the fashion display to display a new fashion display customized to the customer based on the assessed trait.

20 Claims, 5 Drawing Sheets

(56) References Cited

U.S. PATENT DOCUMENTS

| | | | | |
|---|---|---|---|---|
| 2009/0012704 A1* | 1/2009 | Franco | ............... | G01C 21/20 |
| | | | | 701/532 |
| 2014/0035913 A1* | 2/2014 | Higgins | ............... | G06T 17/00 |
| | | | | 345/420 |
| 2015/0026084 A1* | 1/2015 | Guo | ............... | G06T 11/30 |
| | | | | 705/319 |
| 2015/0371260 A1* | 12/2015 | Chan | ............... | G06Q 30/0253 |
| | | | | 705/14.51 |
| 2016/0292917 A1 | 10/2016 | Dorner et al. | | |

OTHER PUBLICATIONS

Newman, Andrew J., and Gordon R. Foxall. "In-store customer behaviour in the fashion sector: some emerging methodological and theoretical directions." International Journal of Retail & Distribution Management 31.11 (2003): 591-600. (Year: 2003).*

* cited by examiner

FASHION DISPLAY METHOD 200

FASHION DISPLAY SYSTEM, METHOD, RECORDING MEDIUM AND DISPLAY APPARATUS

BACKGROUND

The present invention relates generally to a fashion display system and a display apparatus, and more particularly, but not by way of limitation, to a system for augmenting (e.g., changing) a fashion display with data generated based on an assessment of a recognized customer viewing the fashion display such that the fashion display is customized for the customer.

Conventional fashion displays for displaying a fashion product line for customers to view when walking by include store front windows, billboards, posters, etc. which are static images (videos). That is, the fashion display is a one-time generated image (video) that must be manually changed with a new display, re-arrangement of mannequins, etc.

Also, the conventional fashion displays are designed based on a past pattern exhibited by the customers. In other words, a company uses past data to predict what fashion products to include in the images (videos) on the fashion display that will attract future customers without augmenting the display based on the current customer viewing the fashion display.

However, there is a technical problem in the conventional techniques in that the conventional techniques do not augment the fashion display to display a more relevant product of the product line to a customer based on a real-time assessment of the customer and are merely a one-time generated and displayed image (video).

SUMMARY

In view of the technical problem in the art, the inventors have considered the technical solution to the technical problem by augmenting a fashion display based on a real-time assessment of a customer viewing the fashion display such that the customer is provided with a customized fashion display for a product relevant to the customers aesthetic appeal.

In an exemplary embodiment, the present invention can provide a fashion display system, including a customer identification circuit configured to identify a fashion style of the customer viewing a fashion display, a customer assessing circuit configured to determine an assessed trait by assessing the fashion style the customer, and a display augmenting circuit configured to augment the fashion display to display a new fashion display customized to the customer based on the assessed trait.

Further, in another exemplary embodiment, the present invention can provide a fashion display method, including identifying a fashion style of a customer viewing a fashion display, determining an assessed trait of the fashion style of the customer, and augmenting the fashion display to display a new fashion display customized to the customer based on the assessed trait.

Even further, in another exemplary embodiment, the present invention can provide a non-transitory computer-readable recording medium recording a fashion display program, the program causing a computer to perform: identifying a fashion style of a customer viewing a fashion display, determining an assessed trait of the fashion style of the customer, and augmenting the fashion display to display a new fashion display customized to the customer based on the assessed trait.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
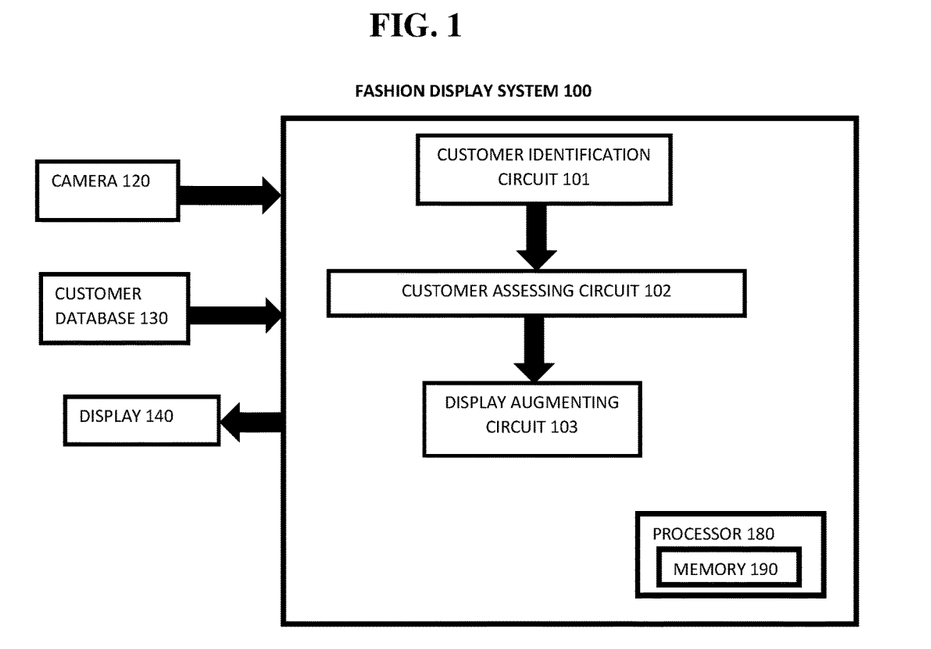
FIG. 1 exemplarily shows a block diagram illustrating a configuration of a fashion display system 100.

With reference now to FIG. 1, the fashion display system 100 includes a customer identification circuit 101, a customer assessing circuit 102, and a display augmenting circuit 103. The fashion display system 100 includes a processor 180 and a memory 190, with the memory 190 storing instructions to cause the processor 180 to execute each circuit of fashion display system 100. The processor and memory may be physical hardware components, or a combination of hardware and software components.

Although the fashion display system 100 includes various circuits, it should be noted that a fashion display system can include modules in which the memory 190 stores instructions to cause the processor 180 to execute each module of fashion display system 100.

Also, each circuit can be a stand-alone device, unit, module, etc. that can be interconnected to cooperatively produce a transformation to a result.

With the use of these various circuits, the fashion display system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 4:
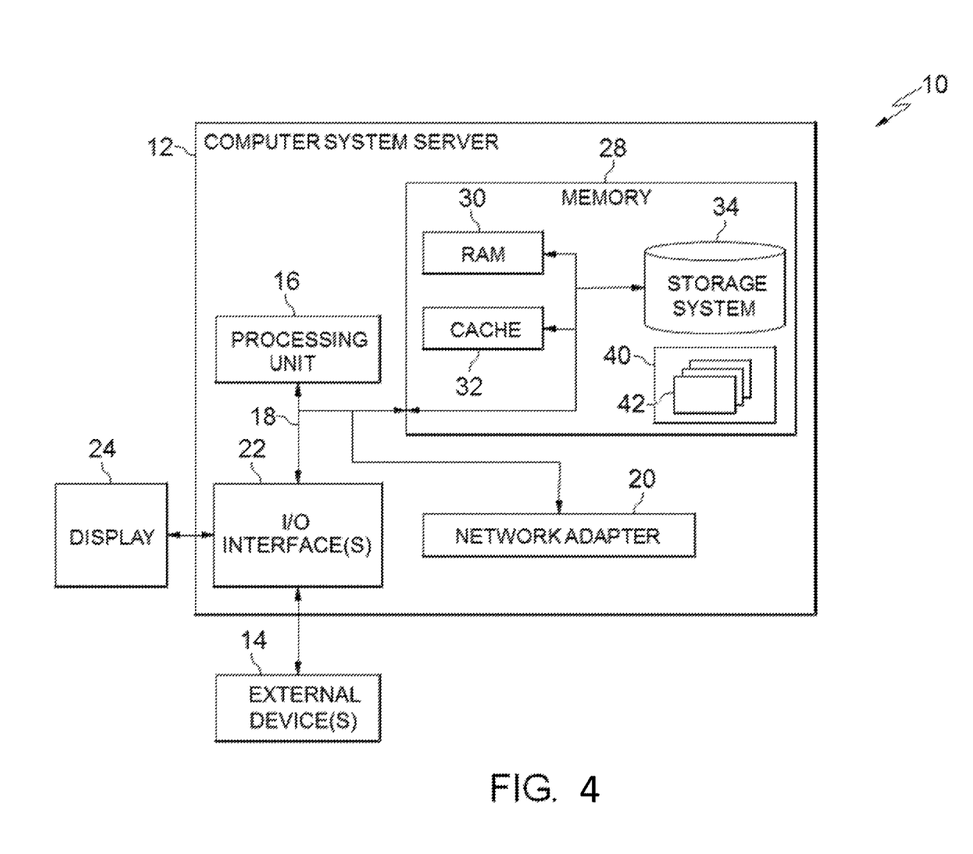
FIG. 4 depicts a cloud computing node 10 according to an exemplary embodiment of the present invention.
Figure 5:
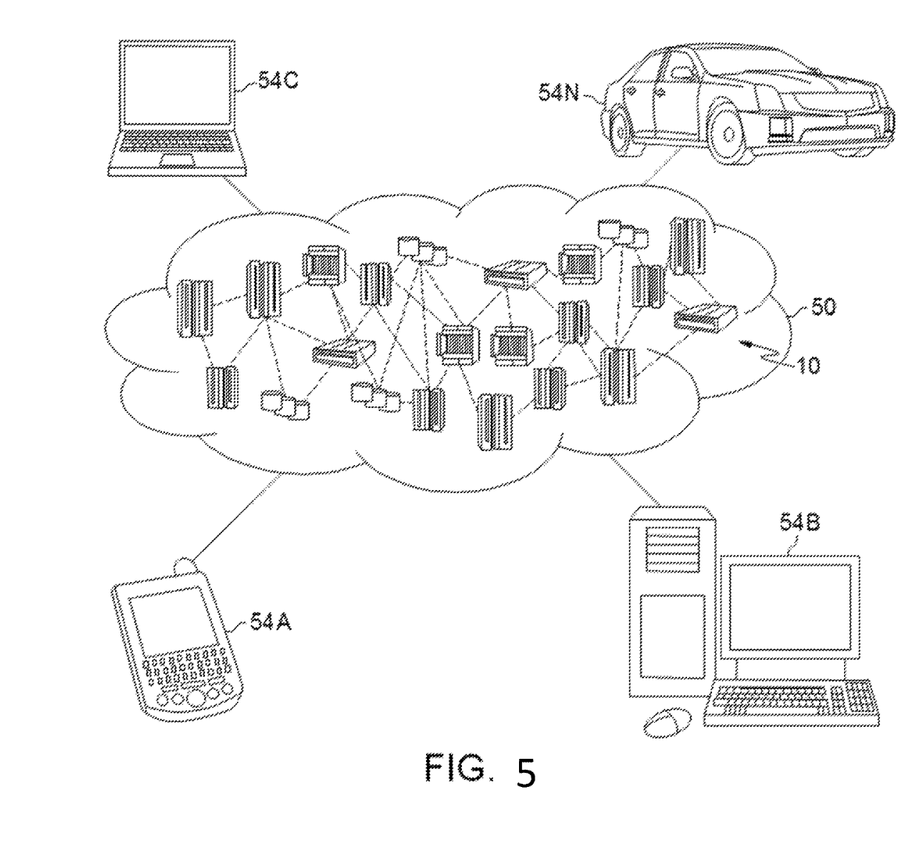
FIG. 5 depicts a cloud computing environment 50 according to another exemplary embodiment of the present invention.
Figure 6:
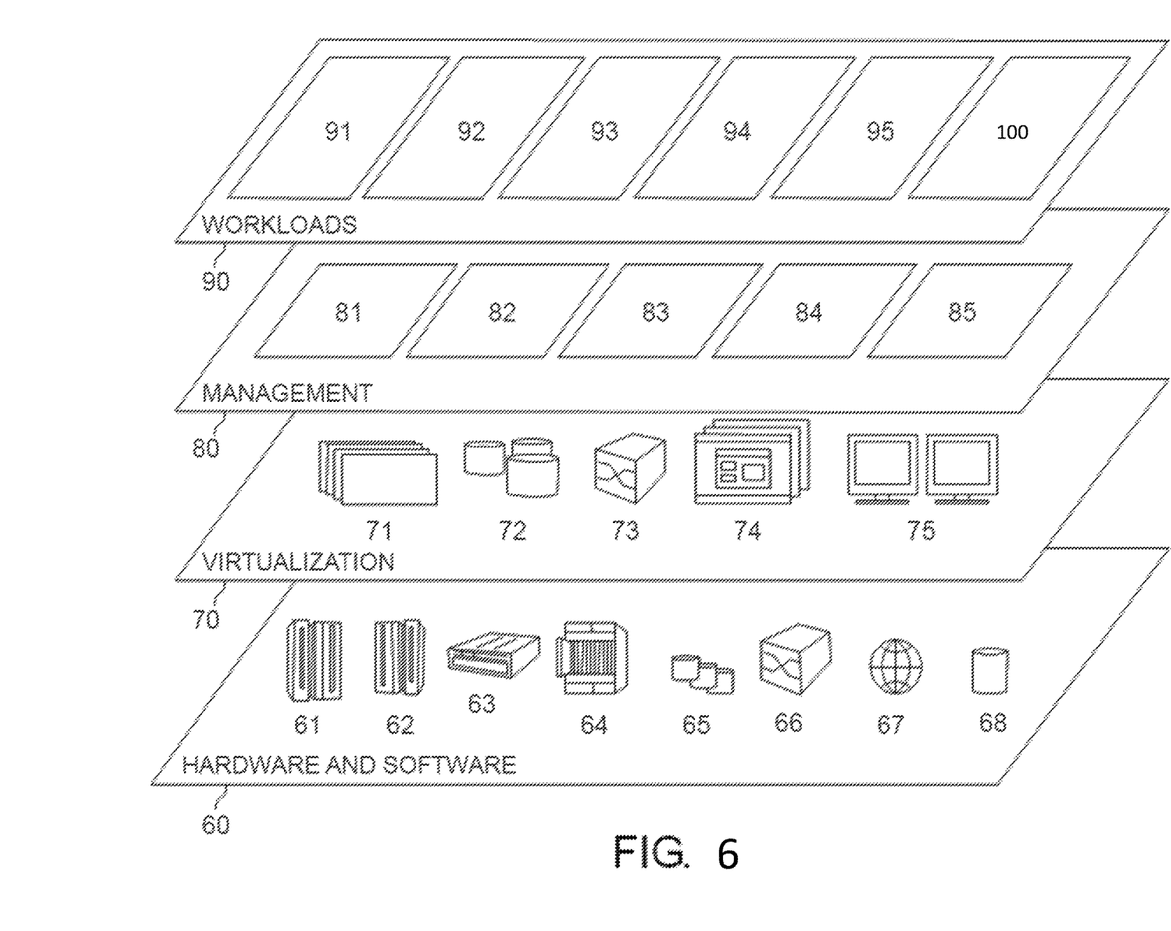
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the fashion display system 100 (FIG. 6), it is noted that the present invention can be implemented outside of the cloud environment.

The customer identification circuit 101 identifies a fashion style of a customer viewing (e.g., walking by) a fashion display via a camera 120. That is, the customer identification circuit 101 individually identifies a fashion style each customer in a proximity of the fashion display such that the fashion display can be augmented (e.g., changed) as described later.

The customer assessing circuit 102 assesses each customer identified by the customer identification circuit 101 for an assessed trait (e.g., an indication of the customer's preference in fashion) such that the display augmenting circuit 103 can augment a current fashion display of the display 140 to display a new fashion display customized to the customer based on the assessed trait.

The assessed trait by the customer assessing circuit 102 can be based on, for example, a determination of a popular fashion (e.g., clothing. accessory, etc.) based on the observation of the customer as collectively assessed as a crowd in a localized area by identifying each individual and determining the popular fashion based on a plurality of the individuals wearing a similar article of fashion or based on what individuals are wearing over a predetermined period of time, a determination of a unique fashion (e.g., clothing. accessory, etc.) based on the observation of the customer, a determination of a popular fashion/clothing attributes (e.g., color, fabric patterns, style, fit) based on the observation of the customer, an assessment of demographic information including gender, age, income level, etc. according to the customer identification circuit 101 identifying the customer and correlating the customer to data for the particular customer stored in a customer database 130 (e.g., data from a previous shopping experience, data from a credit card application, etc.), a determination of what the customer is currently wearing to thereby set the assessed trait as customer's fashion preference and also suggest items that may go well with what the customer is currently wearing, a determination of current customer mood (e.g. based on facial expression, gestures, speech, etc.), a past shopping history of the customer according to customer data of the customer database 130, a determination of a cohort of the customer based on the information in social media corresponding to the cohort, for example, based on people who friended him/her, a past wish list of the customer, a past search history of the customer as assessed from the customer database 130, or the like.

For example, for the past shopping history of the customer according to the customer data of the customer database 130, the customers can opt-in (e.g., authorize) to having their customer history further customize the change in fashion display. After a customer authorizes the store or fashion display to use their identification to further customize the fashion display, the customer identification circuit 101 can further identify an identity of the customer such that the fashion display can be personalized using the customer history.

"Popular fashion" as an assessed trait can be estimated from a centroid of a distribution (or creation of several clusters) in a multidimensional space including color, texture, sheen, degree of skin exposure, presence of sleeves/collars, solid, floral, spotted, plaid, striped, graphics, and the like.

It is noted that each assessed trait can be individually measured for the customer or aggregated over a crowd of customers to augment the display via the display augmenting circuit 103 based on a most relevant fashion display according to the crowd of customers. If the fashion display is aggregated over a crowd, the fashion display can display a plurality of models wearing fashion directed to a plurality of assessed traits. In other words, if the fashion display has five models, the top five assessed traits can be displayed. Or, the fashion display can include a model having a fashion style for each of the customers according to the assessed traits for each customer, respectively. In this manner, the fashion display can adaptively market to a plurality of customers who have different fashion tastes that are each sold at a particular store.

The customer assessing circuit 102 can determine the assessed trait based on a pose or gait of the customer such that the model wearing clothing may be controlled (e.g., in terms of gait or pose). That is, the display augmenting circuit 103 can augment the fashion display such that the model is using a similar (same) pose as the customer.

Thus, the customer's fashion can be described with semantic attributes (e.g., pose) by using a fully automated technique that can generate a list of nameable attributes for clothes on human body in unconstrained images. The technique extracts low-level features in a pose-adaptive manner, and combine complementary features for learning attribute classifiers. Mutual dependencies between the attributes are then explored by a Conditional Random Field to further improve the predictions from independent classifiers. With an estimated human pose, an attribute learning algorithm generates semantic attributes for the clothing.

The display augmenting circuit 103 can also augment the display based on a non-customer related factor such as a current weather condition, a future weather condition, a current availability of the fashion item, a sale of an item, or the like. For example, if the weather is currently sunny but rain is predicted for the next couple of days, the display augmenting circuit 103 can augment the display such that the fashion models are wearing rain coats, using umbrellas, wearing rain boots, etc. and indicate that rain is coming. The display augmenting circuit 103 can augment the display based on factors other than the assessed traits when there is a large crowd of customers, when there are no customers identified by the customer identification circuit 101, or as a standard display before the display augmenting circuit 103 further augments the fashion display based on the assessed trait. The owner of the display can preferentially set how/when the display augmenting circuit uses the assessed traits or the non-customer related factor.

Also, after the display augmenting circuit 103 augments the fashion display according to the assessed trait, the customer identification circuit 101 can identify if the customer(s) "like" the new fashion display by analyzing a facial expression, gestures, speech, etc. of the customer. Alternatively, the customer can "like" the new fashion display via an interactive display mechanism on the display 140, using a mobile device, pressing a button on the exterior of the display window, etc. such that the display augmenting circuit 103 can "learn" which augmentations were liked by the customers and which were not. The feedback can also be used by a company (e.g., fashion retailer) to increase their revenue by receiving real-time feedback.

Also, the display augmenting circuit 103 can use the assessed trait of the pose of the user and display the customer on the fashion display wearing the article of fashion. Thereby, the customer can see how they would look wearing the article of fashion before entering the store.

Each of the articles of fashion of the augmented fashion display can include descriptions, sales prices, sales alerts, regular prices, and per unit quantity prices, or the like displayed on a region of the display 140.

In an alternative embodiment, the display 140 can be customized outfits shown on mannequins (e.g., a 3-D window display). In this case, if the changing of the clothing on mannequins is difficult to do in "real-time", the display 140 can include multiple mannequins each wearing diverse styles/colors of outfits. Based on the assessed traits of the customer(s), a mannequin(s) with an outfit(s) that best match the assessed trait are shown in the window display. For example, mannequins could be deployed on a linear or circular conveyor belt, and the mannequins with the "best match" are moved to the front upon detecting the customer's fashion taste. Or, the mannequins can be stored in a different location, each mannequin having a camera recording the mannequin and connected to the display 140 such that when the particular mannequin is selected to best match the assessed trait, the camera turn "on" such that the display 140 displays the mannequin from the different location. Even further, the display 140 can include a known hologram generating technology such that the display 140 displays a 3-dimensional hologram of the model based on the assessed trait. Such hologram technology would facilitate easy real-time augmentations of the mannequin's fashion.

Figure 2:
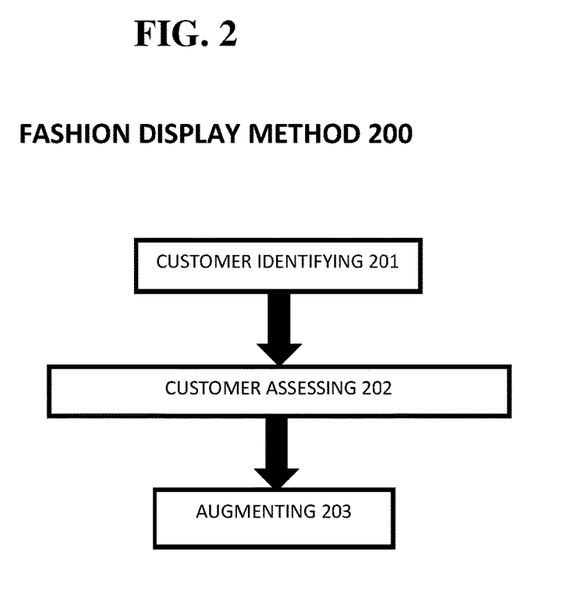
FIG. 2 exemplarily shows a high level flow chart for a fashion display method 200.

FIG. 2 shows a high level flow chart for a method 200 of fashion display.

Step 201 identifies a customer viewing (or walking by) a fashion display via a camera 120. That is, Step 201 individually identifies each customer in a proximity of the fashion display such that the fashion display can be augmented (e.g., changed).

Step 202 assesses each customer identified by Step 201 for an assessed trait (e.g., an indication of the customer's preference in fashion) such that Step 203 can augment a current fashion display of the display 140 to display a new fashion display customized to the customer based on the assessed trait.

Figure 3:
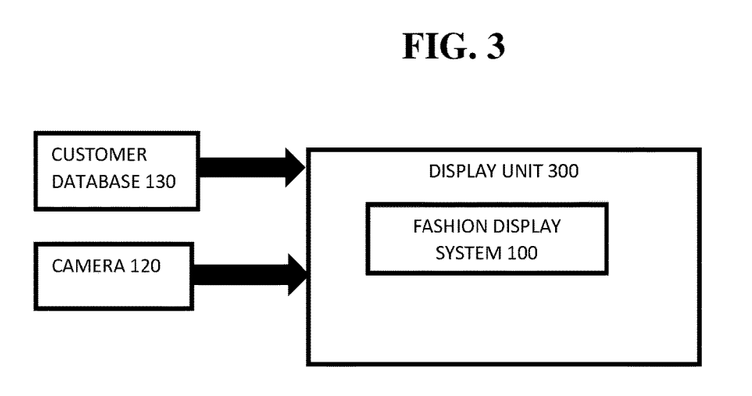
FIG. 3 exemplarily shows a display unit 300 for displaying a fashion display according to the fashion display system 100.

FIG. 3 shows a display unit 300 for displaying a fashion display using the fashion display system 100.

The display unit 300 can be a store display window that is connected to an electronic commerce terminal to become an advertising and payment system and method for retail store applications including point of sale transactions, and window display transactions.

Further, the display unit 300 can be a display on the side of a vehicle, a store shelf, a billboard, etc. That is, the display unit 300 can be installed in any location so long as the display unit 300 can receive feed data from a camera 120 such that the customer identification circuit 101 and the customer assessing circuit 102 of the fashion display system 100 can identify customers and assess traits of the customer such that the display of the display unit 300 can be augmented by the display augmenting circuit 103.

Even further, the display unit 300 could be configured to be installed on a physical shopping cart. In this manner, the display unit can also serve a related use of advertising and promotion system including an electronic shopping cart display screen that provides wireless in-store advertising and promotions. The display unit 300 can be interactive (i.e., capable of responding to user information requests and directions) or passive (i.e., only requiring the shopper to push the cart down the aisle where it will automatically receive a signal and alert the shopper to promotions and advertised specials).

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the fashion display system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A fashion display system, comprising:
a processor; and
a memory, the memory storing instructions to cause the processor to execute:
   a customer identification circuit, in a camera, configured to identify, via the camera, a fashion style of a customer viewing a fashion display in a store;
   a customer assessing circuit configured to determine an assessed trait of the customer by assessing the fashion style of the customer; and
   a display augmenting circuit configured to augment the fashion display to display a new fashion display customized to the customer based on the assessed trait according to an availability of the new fashion display that is stored in a database in the store having the fashion display,
wherein the customer identification circuit identifies, via the camera, the fashion style with semantic attributes by:
   generating a list of nameable attributes for clothes on the customer in unconstrained images;
   extracting low-level features from the semantic attributes in a pose-adaptive manner; and
   combining complementary features from the semantic attributes for learning attribute classifiers, and
wherein attribute classifiers are learned by a reduction of a set of behavioral measures over a period of time to a set of feature nodes and vectors, corresponding to the behavioral measures representations in a lower dimensional feature space which is then used to identify a certain cognitive state over that period of time to classify as the attribute classifiers.

2. The system of claim 1, wherein the customer identification circuit identifies the fashion style of a plurality of customers, and
wherein the customer assessing circuit determines the assessed trait aggregately for the plurality of customers such that the fashion display is augmented by the display augmenting circuit based on an aggregated assessed trait for the plurality of customers.

3. The system of claim 1, wherein the new fashion display includes a fashion product related to the assessed trait of the customer.

4. The system of claim 1, wherein customer identification circuit further identifies an identity of the customer based on an authorization by the customer, and
wherein the assessed trait is determined based on any one of:
   a determination of a popular fashion similar to a fashion product that the identified customer is wearing;
   a determination of a unique fashion of the customer;
   a determination of a fashion attribute;
   an assessment of a demographic information of the customer;
   a determination of a matching article of fashion that would be worn with the fashion product that the identified customer is wearing;
   a determination of a current mood of the customer;
   a past shopping history of the customer;
   a determination of a cohort of the customer based on information in social media corresponding to the cohort; and
   a past fashion search history of the customer.

5. The system of claim 1, wherein the assessed trait is determined based on a determination of a popular fashion calculated over a predetermined time based on a fashion choice of a plurality of customers identified by the customer identification circuit.

6. The system of claim 1, wherein the display augmenting circuit further augments the fashion display based on a non-customer related condition.

7. The system of claim 6, wherein the non-customer related condition includes one of:
   a current weather condition;
   a future weather condition;
   a current availability of a fashion product; and
   a sale of the fashion product.

8. The system of claim 1, wherein the display augmenting circuit overrides the augmenting of the fashion display by augmenting the fashion display to display a fashion product related to a future weather condition.

9. The system of claim 1, wherein the display augmenting circuit intermittently augments the fashion display to display a fashion product related to a future weather condition.

10. The system of claim 1, wherein the new fashion display includes an image of the customer wearing a fashion product based on the assessed trait.

11. The system of claim 1, wherein the customer identification circuit identifies the fashion style of a plurality of customers,
wherein the assessing circuit determines the assessed trait for each of the plurality of customers, and
wherein the display augmenting circuit augments the fashion display such that the new fashion display includes a fashion product corresponding to each of the plurality of customers based on the assessed trait for each customer.

12. The system of claim 1, wherein the customer identification circuit identifies the fashion style of a plurality of customers,
wherein the customer assessing circuit determines the assessed trait for each of the plurality of customers, and
wherein the display augmenting circuit augments the fashion display such that the new fashion display includes a plurality of fashion products corresponding to the most frequently assessed traits for the plurality of customers.

13. The system of claim 1, wherein the assessed trait is based on a pose of the customer, and
wherein the new fashion display includes a fashion product displayed in a same pose as the assessed trait.

14. The system of claim 4, wherein the popular fashion is determined from a centroid of a distribution in a multidimensional space including:
   a color of the fashion product;
   a texture of the fashion product;
   a sheen of the fashion product;
   a degree of skin exposure caused by the fashion product;
   a presence of a sleeve of the fashion product;
   a presence of a collar of the fashion product,
   a solid color-schemed fashion product, a floral color-schemed fashion product;
a spotted color-schemed fashion product;
a plaid color-schemed fashion product;
a striped color-schemed fashion product and
a graphical-scheme of the fashion product.

15. The system of claim 1, wherein the customer identification circuit identifies a satisfaction of the customer with the new fashion display based on at least one of a facial expression of the customer, a gesture by the customer, and speech by the customer.

16. The system of claim 1, wherein the fashion display comprises a plurality of mannequins each including a different fashion style, and
wherein the display augmenting circuit causes a mannequin of the plurality of mannequins having a fashion style most similar to the assessed trait to be displayed as the new fashion display.

17. A fashion display method, comprising:
identifying, via a camera, a fashion style of a customer viewing a fashion display in a store;
determining an assessed trait of the fashion style of the customer; and
augmenting the fashion display to display a new fashion display customized to the customer based on the assessed trait according to an availability of the new fashion display stored in a database in the store having the fashion display,
wherein identifying identifies, via the camera, the fashion style with semantic attributes by:
generating a list of nameable attributes for clothes on the customer in unconstrained images;
extracting low-level features from the semantic attributes in a pose-adaptive manner; and
combining complementary features from the semantic attributes for learning attribute classifiers,
wherein attribute classifiers are learned by a reduction of a set of behavioral measures over a period of time to a set of feature nodes and vectors, corresponding to the behavioral measures representations in a lower dimensional feature space which is then used to identify a certain cognitive state over that period of time to classify as the attribute classifiers.

18. A non-transitory computer-readable recording medium recording a fashion display program, the program causing a computer to perform:
identifying, via a camera, a fashion style of a customer viewing a fashion display in a store;
determining an assessed trait of the fashion style of the customer; and
augmenting the fashion display to display a new fashion display customized to the customer based on the assessed trait according to an availability of the new fashion display stored in a database in the store having the fashion display,
wherein identifying identifies, via the camera, the fashion style with semantic attributes by:
generating a list of nameable attributes for clothes on the customer in unconstrained images;
extracting low-level features from the semantic attributes in a pose-adaptive manner; and
combining complementary features from the semantic attributes for leaning attribute classifiers,
wherein attribute classifiers are learned by a reduction of a set of behavioral measures over a period of time to a set of feature nodes and vectors, corresponding to the behavioral measures representations in a lower dimensional feature space which is then used to identify a certain cognitive state over that period of time to classify as the attribute classifiers.

19. The non-transitory computer-readable recording medium of claim 18, wherein the new fashion display includes a fashion product related to the assessed trait of the customer.

20. The system of claim 1, embodied in a cloud-computing environment.

* * * * *